(12) United States Patent
Okamoto et al.

(10) Patent No.: US 9,548,073 B1
(45) Date of Patent: Jan. 17, 2017

(54) SYSTEMS AND METHODS FOR PROVIDING HIGH PERFORMANCE SOFT MAGNETIC UNDERLAYERS FOR MAGNETIC RECORDING MEDIA

(71) Applicant: WD MEDIA, LLC, San Jose, CA (US)

(72) Inventors: Iwao Okamoto, Singapore (SG); Debashish Tripathy, San Jose, CA (US); Fei Qin, Singapore (SG)

(73) Assignee: WD Media, LLC, San Jose, CA (US)

( * ) Notice: Subject to any disclaimer, the term of this patent is extended or adjusted under 35 U.S.C. 154(b) by 285 days.

(21) Appl. No.: 13/799,659

(22) Filed: Mar. 13, 2013

(51) Int. Cl.
*G11B 5/66* (2006.01)
*G11B 5/667* (2006.01)
*G11B 5/84* (2006.01)
*G11B 5/851* (2006.01)

(52) U.S. Cl.
CPC ............ *G11B 5/667* (2013.01); *G11B 5/8404* (2013.01); *G11B 5/851* (2013.01)

(58) Field of Classification Search
None
See application file for complete search history.

(56) References Cited

U.S. PATENT DOCUMENTS

| | | | |
|---|---|---|---|
| 4,300,958 A * | 11/1981 | Suzuki | H01F 1/04 148/120 |
| 6,656,613 B2 | 12/2003 | Litvinov et al. | |
| 6,667,118 B1 | 12/2003 | Chang et al. | |
| 7,060,376 B1 | 6/2006 | Chang et al. | |
| 7,179,549 B2 | 2/2007 | Malhotra et al. | |
| 7,542,235 B2 * | 6/2009 | Kuboki | 360/135 |
| 2006/0228587 A1* | 10/2006 | Kuboki | 428/829 |
| 2007/0253103 A1* | 11/2007 | Racine et al. | 360/125 |
| 2009/0011283 A1* | 1/2009 | Girt et al. | 428/846 |
| 2009/0213494 A1 | 8/2009 | Dai et al. | |
| 2011/0143169 A1* | 6/2011 | Albrecht et al. | 428/846 |
| 2011/0151278 A1* | 6/2011 | Gurney et al. | 428/800 |
| 2011/0262776 A1* | 10/2011 | Chen et al. | 428/846.6 |
| 2012/0099220 A1 | 4/2012 | Tamai et al. | |
| 2015/0034483 A1* | 2/2015 | Fukuoka | G11B 5/851 204/298.13 |

FOREIGN PATENT DOCUMENTS

JP   2012-169021 A  * 9/2012

OTHER PUBLICATIONS

Abstract Translation of JP_2012_169021_A (published 2012).*
English Translation of JP 2012-169021 A (pub. 2012).*

* cited by examiner

*Primary Examiner* — Kevin Bernatz
(74) *Attorney, Agent, or Firm* — Gabriel Fitch; Loza & Loza, LLP

(57) ABSTRACT

Systems and methods for providing high performance soft magnetic underlayers for magnetic recording media are described. One such magnetic recording medium includes a substrate, an amorphous soft magnetic underlayer including CoFeMoNb on the substrate, where an atomic percent of the Mo is greater than about 8 and an atomic percent of the Nb is greater than about 9, and a magnetic recording layer on the soft magnetic underlayer.

6 Claims, 2 Drawing Sheets

SYSTEMS AND METHODS FOR PROVIDING HIGH PERFORMANCE SOFT MAGNETIC UNDERLAYERS FOR MAGNETIC RECORDING MEDIA

FIELD

The present invention relates generally to magnetic recording, and more specifically to systems and methods for providing high performance soft magnetic underlayers for magnetic recording media.

BACKGROUND

Perpendicular magnetic recording is a form of magnetic recording in which bits of information are stored in a direction that is perpendicular to the plane of the recording media, which is typically a rotating disk forming part of a disk drive. To obtain this orientation of the bit magnetization, the anisotropy constant of the magnetic recording layer is configured such that its "easy" magnetic axis is perpendicular to the plane of the media. The magnetization establishing each bit is imparted by a write head. The layer in which the bits are formed is typically a magnetically "hard" recording layer. ("Hardness" and "softness" in this context refers to the ability for producing saturation in a magnetic layer with increasing external magnetic fields. A soft layer can produce magnetic saturation significantly faster than a hard layer.) In order to provide an appropriate closed loop for the field created by the write head when writing each bit, the hard recording layer is usually formed atop a "soft" magnetic underlayer ("SUL").

While the role of the recording layer is to carry the individual bits of recorded data, the role of the SUL is to guide the magnetic write field flux perpendicularly through the recording layer and then through the SUL in a return path to the write head. Often however, the SUL does not sufficiently guide the magnetic write field produced by a write head and is a source of noise. As such, there is a need for a SUL that better guides or enhances the write field and reduces noise.

SUMMARY

Aspects of the invention relate to systems and methods for providing high performance soft magnetic underlayers for magnetic recording media. In one embodiment, the invention relates to a magnetic recording medium including a substrate, an amorphous soft magnetic underlayer including CoFeMoNb on the substrate, where an atomic percent of the Mo is greater than about 8 and an atomic percent of the Nb is greater than about 9, and a magnetic recording layer on the soft magnetic underlayer.

In another embodiment, the invention relates to a method for manufacturing a magnetic recording medium, the method including providing a substrate, providing an amorphous soft magnetic underlayer including CoFeMoNb on the substrate, where an atomic percent of the Mo is greater than about 8 and an atomic percent of the Nb is greater than about 9, and providing a magnetic recording layer on the soft magnetic underlayer.

DETAILED DESCRIPTION

Figure 1:
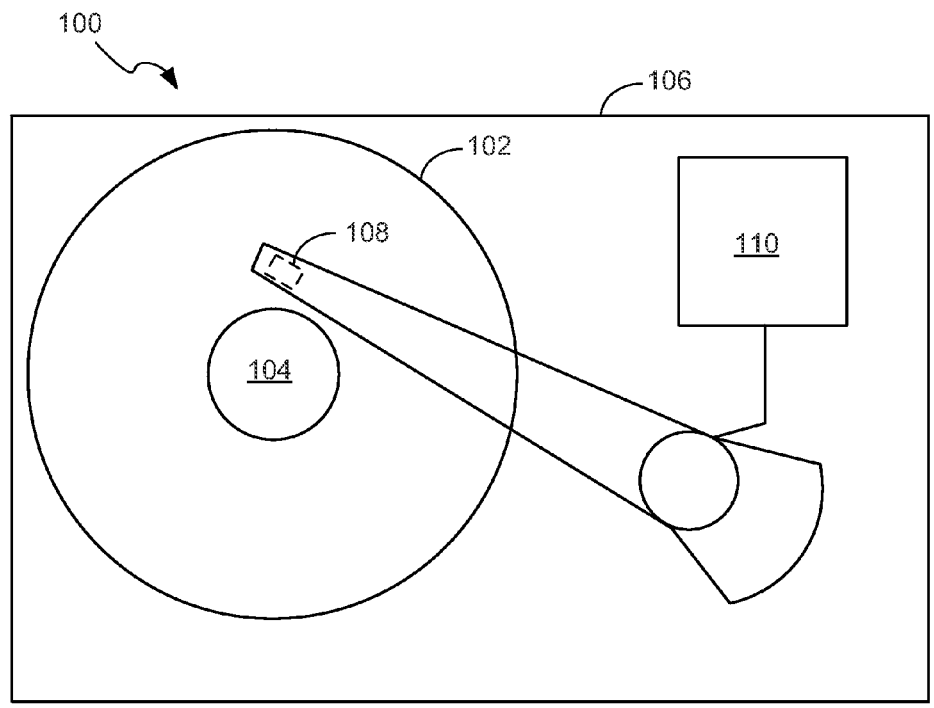
FIG. 1 is a top schematic view of a hard disk drive including a magnetic medium with an amorphous soft magnetic underlayer made of CoFeMoNb in accordance with one embodiment of the invention.

Referring now to the drawings, embodiments of systems and methods for providing high performance soft magnetic underlayers for magnetic recording media are illustrated. The soft magnetic underlayers include an amorphous layer of CoFeMoNb, where an atomic percent of the Mo is greater than about 8 and an atomic percent of the Nb is greater than about 9. As compared to media having conventional soft magnetic underlayers which often include Ta, which can be quite expensive, media having the amorphous soft magnetic underlayers with CoFeMoNb enhance guidance of head fields in the media. In addition, media having the amorphous soft magnetic underlayers with CoFeMoNb provide better signal to noise performance and a smoother media surface that can result in reduced head flying height, which provides a number of benefits. In addition, the amorphous soft magnetic underlayers with CoFeMoNb provide higher crystallographic operating temperature and improved overwrite.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

FIG. 1 is a top schematic view of a hard disk drive 100 including a magnetic medium 102 with an amorphous soft magnetic underlayer made of CoFeMoNb in accordance with one embodiment of the invention. The magnetic medium 102 is embodied in one or more disks to store data. Disk/medium 102 resides on a spindle assembly 104 that is mounted to drive housing 106. Data may be stored along tracks in the magnetic recording layer of disk 102. The reading and writing of data is accomplished with head 108 that has both read and write elements. The write element is used to alter the properties of the magnetic recording layer of disk 102. In one embodiment, head 108 may have magneto-resistive (MR), or giant magneto-resistive (GMR) elements. In an alternative embodiment, head 108 may be another type of head, for example, an inductive read/write head or a Hall effect head.

In operation, a spindle motor (not shown) rotates spindle assembly 104, and thereby rotates disk 102 to position head 108 at a particular location along a desired disk track. The position of head 108 relative to disk 102 may be controlled by position control circuitry 110. The disk/medium 102 includes the amorphous soft magnetic underlayer including CoFeMoNb, where an atomic percent of the Mo is greater than about 8 and an atomic percent of the Nb is greater than about 9, which enhances guidance of the head fields in the medium during writing or reading operations. In addition, the amorphous soft magnetic underlayer in the medium 102 provides better signal to noise performance and a smoother media surface that can result in reduced head flying height as compared to conventional SULs in magnetic media. As such, the performance of the disk drive as a whole can be improved.

Figure 2:
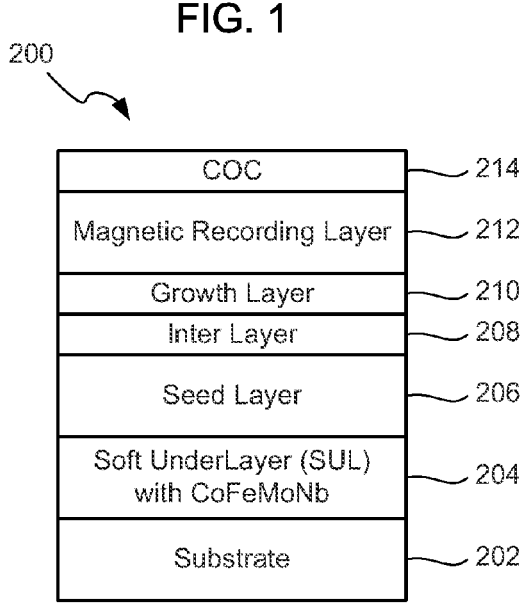
FIG. 2 is a cross sectional schematic view of a magnetic medium with an amorphous soft magnetic underlayer made of CoFeMoNb in accordance with one embodiment of the invention.

FIG. 2 is a cross sectional schematic view of a magnetic medium 200 with an amorphous soft magnetic underlayer (SUL) 204 made of CoFeMoNb in accordance with one embodiment of the invention. The magnetic medium 200 has a stacked structure with a base layer substrate 202, the amorphous SUL 204 on the substrate 202, a seed layer 206 on the amorphous SUL 204, an interlayer 208 on the seed layer 206, a growth layer 210 on the interlayer 208, a magnetic recording layer 212 on the growth layer 210, and a carbon over coat (COC) layer 214 on the magnetic recording layer 212.

Several of the layers in the medium 200 can be multi-layered. For example, the amorphous SUL 204 can include three layers, such as a CoFeMoNb layer, a Ru layer, and a CoFeMoNb layer (e.g., stacked in that order from bottom to top), where the Ru layer enables anti-parallel coupling of magnetizations in the top and bottom CoFeMoNb layers. In other embodiments, the SUL 204 can include other suitable layers with suitable materials. In several embodiments, an atomic percent of the Mo in the SUL 204 is greater than about 8 and an atomic percent of the Nb is greater than about 9. In one embodiment, the atomic percent of Nb in the SUL 204 is greater than the atomic percent of Mo. In one embodiment, the atomic percent of the Mo is about 8 in the SUL 204 and the atomic percent of the Nb is about 9. In one embodiment, a preferred ratio of Mo to Nb is about one to one while also keeping the percentage of Nb slightly greater than the percentage of Mo. In several embodiments, the SUL 204 does not include Ta, which can be very expensive.

In some embodiments, the seed layer 206 can include two layers, such as a Ta layer and a NiWFe layer (e.g., stacked in that order from bottom to top). In other embodiments, the seed layer 206 can include other suitable layers with suitable materials. The interlayer 208 can be made of Ru, Co and/or other suitable materials. The growth layer 210 is configured to facilitate the growth of the magnetic recording layer 212 and can be made of Ru and/or other suitable materials.

The magnetic recording layer 212 can be composed of two sub-layers including a granular layer and a capping layer (e.g., arranged such that capping layer is on the granular layer). The granular layer can be a multi-layer structure (e.g., seven layer structure) made of materials including Co, Cr, Ru, TiO2, Pt, B, SiO2, Cr2O3, CoO, Co3O4, and/or other suitable materials. In several embodiments, the granular layer is composed of magnetic layers interleaved with non-magnetic layers in a structure configured to facilitate magnetic recording. The capping layer can be made of materials including Co, Cr, Pt, B, and/or other suitable materials.

The substrate can be made of materials including Al alloy, NiP plated Al, glass, glass ceramic, and/or other suitable materials. The COC layer 214 can be made of carbon and/or other suitable materials known in the art.

In several embodiments, the magnetic medium structure 200 of FIG. 2 can be formed using sputter deposition and/or other suitable deposition methods known in the art. In a number of embodiments, the medium 200 is configured for use in a perpendicular magnetic recording system. In other embodiments, the medium can be used in other types of recording systems such as heat assisted magnetic recording (HAMR), energy assisted magnetic recording (EAMR), and/or microwave assisted magnetic recording (MAMR) systems.

In some embodiments, additional layers, as are well known in the art, can be included in the medium 200. In one such embodiment, the magnetic medium 200 further includes an adhesion layer disposed between the substrate 202 and the SUL 204. In such case, the adhesion layer can be made of Cr, Ti, and/or other suitable materials known in the art. In one embodiment, some layers, as is well known in the art, can be omitted from the medium 200.

As compared to media having conventional soft magnetic underlayers which often include Ta, media having the amorphous soft magnetic underlayers with CoFeMoNb enhance guidance of head fields in the media. In addition, media having the amorphous soft magnetic underlayers with CoFeMoNb provide better signal to noise performance (e.g., about 0.12 to 0.26 decibels improvement) and a smoother media surface (e.g., reduced surface roughness) that can result in reduced head flying height (e.g., reduced head to media spacing by about 7 to 10 percent), which provides a number of benefits. In addition, the amorphous soft magnetic underlayers with CoFeMoNb provide higher crystallographic operating temperature and improved overwrite, and it provides higher coercivity in a sputtering process. As compared to the conventional media with soft magnetic underlayers including Ta, media having the amorphous soft magnetic underlayers with CoFeMoNb provide show greater touch down power which can enable a head to get about 1.3 to about 1.8 Angstroms closer to the media. As discussed above, the reduced head flying height provides a number of benefits. In several embodiments, the amorphous soft magnetic underlayer including CoFeMoNb is capable of sustaining higher heating processes than conventional media with soft magnetic underlayers.

Figure 3:
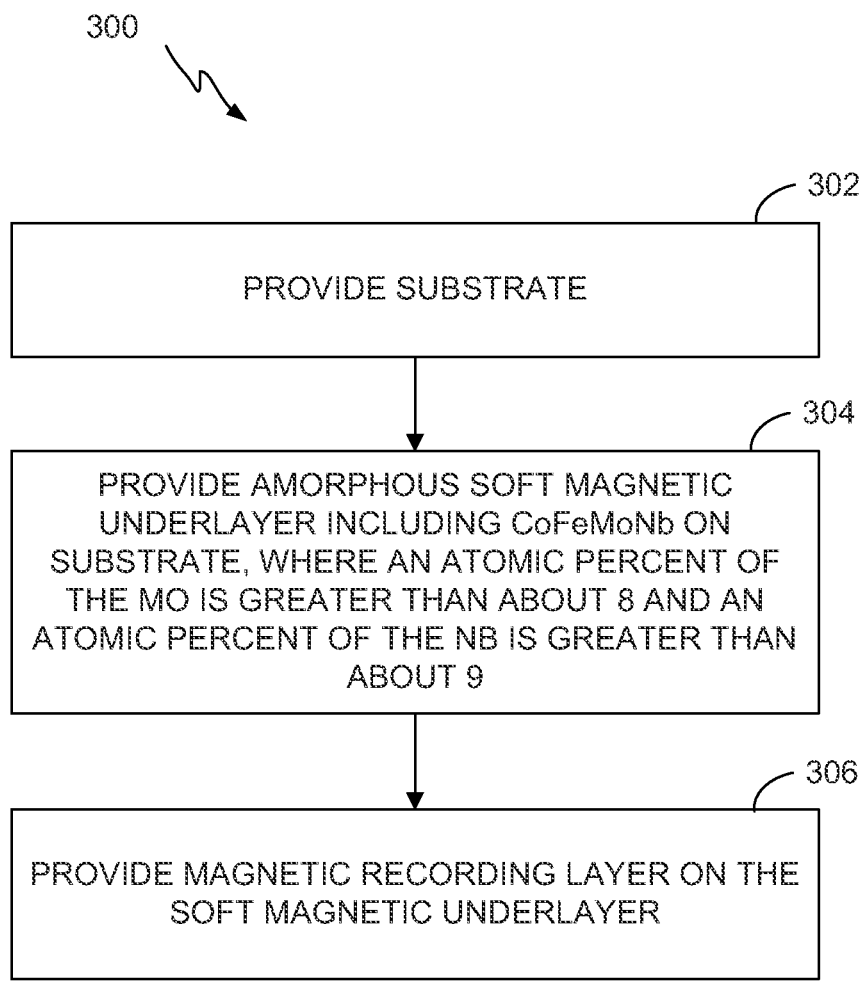
FIG. 3 is a flow chart of a process for manufacturing magnetic media with an amorphous soft magnetic underlayer made of CoFeMoNb in accordance with one embodiment of the invention.

FIG. 3 is a flow chart of a process 300 for manufacturing magnetic media with an amorphous soft magnetic underlayer made of CoFeMoNb in accordance with one embodiment of the invention. In particular embodiments, the process 300 can be used to form the magnetic media of FIG. 1 and/or FIG. 2. The process first provides (302) a substrate. The process then provides (304) an amorphous soft magnetic underlayer including CoFeMoNb on the substrate, where an atomic percent of the Mo is greater than about 8 and an atomic percent of the Nb is greater than about 9. In one embodiment, the process provides the amorphous soft magnetic underlayer including CoFeMoNb on the substrate using a sputtering process where a biasing voltage having a magnitude of about 200 to 500 volts is applied during the sputtering process to ensure a smooth surface for the SUL and consequently for the media as a whole. The process then provides (306) a magnetic recording layer on the soft magnetic underlayer.

In several embodiments, the process can include additional actions. For example, the process can include the additional actions needed to form the magnetic medium of FIG. 2. In such case, the process can further include providing a seed layer on the substrate, providing an interlayer on the seed layer, providing a growth layer on the interlayer, providing a granular layer on the growth layer, providing a capping layer on the granular layer, and providing an overcoat layer on the capping layer. In such case, the soft magnetic underlayer is positioned between the substrate and the seed layer, and the magnetic recording layer includes the granular layer and the capping layer. In other embodiments, the process can be modified in accordance with a type of media desired (e.g., HAMR, EAMR, and/or MAMR media).

In several embodiments, the layers of process 200 are formed by deposition. In such case, the deposition can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A magnetic recording medium comprising:
   a substrate;
   an amorphous soft magnetic underlayer consisting of CoFeMoNb on the substrate, wherein an atomic percent of the Mo is about 8 and an atomic percent of the Nb is about 9; and
   a magnetic recording layer on the soft magnetic underlayer.

2. The magnetic recording medium of claim 1, wherein the atomic percent of the Nb is greater than the atomic percent of the Mo.

3. The magnetic recording medium of claim 1, further comprising:
   a seed layer on the substrate;
   an interlayer on the seed layer;
   a growth layer on the interlayer;
   a granular layer on the growth layer;
   a capping layer on the granular layer; and
   an overcoat layer on the capping layer,
   wherein the soft magnetic underlayer is positioned between the substrate and the seed layer, and
   wherein the magnetic recording layer comprises the granular layer and the capping layer.

4. The magnetic recording medium of claim 3:
   wherein the substrate comprises a material selected from the group consisting of an Al alloy, NiP plated Al, glass, glass ceramic, and combinations thereof;
   wherein the seed layer comprises a material selected from the group consisting of Ni, W, Fe, and combinations thereof;
   wherein the interlayer comprises a material selected from the group consisting of Ru, Co, and combinations thereof;
   wherein the growth layer comprises Ru;
   wherein the granular layer comprises a material selected from the group consisting of Co, Cr, Ru, $TiO_2$, Pt, B, $SiO_2$, $Cr_2O_3$, CoO, $Co_3O_4$, and combinations thereof;
   wherein the capping layer comprises a material selected from the group consisting of Co, Cr, Pt, B, and combinations thereof; and
   wherein the overcoat layer comprises C.

5. The magnetic recording medium of claim 1, wherein the magnetic recording medium and the soft magnetic underlayer are configured to be used in a perpendicular magnetic recording system.

6. The magnetic recording medium of claim 1:
   wherein the atomic percent of the Mo is 8 and the atomic percent of the Nb is 9.

* * * * *